United States Patent [19]

Shames

[11] 3,921,750
[45] Nov. 25, 1975

[54] VEHICLE BRAKE WARNING LIGHT SYSTEM ACCELERATOR PEDAL SWITCH

[76] Inventor: Max Shames, 1213 Preston Way, Venice, Calif. 90291

[22] Filed: June 20, 1974

[21] Appl. No.: 481,054

Related U.S. Application Data

[62] Division of Ser. No. 379,239, July 16, 1973.

[52] U.S. Cl. .............. 180/103; 200/61.89; 200/76; 200/86.5; 200/153 C; 340/71
[51] Int. Cl.². B60Q 1/30; H01H 3/14; H01H 15/18
[58] Field of Search .......... 180/103; 200/61.89, 76, 200/86.5, 153 C; 340/71, 72, 52 B

[56] References Cited
UNITED STATES PATENTS

| 2,526,850 | 10/1950 | Charbonneau | 200/76 |
| 2,812,402 | 11/1957 | Dixon | 200/86.5 |
| 2,822,441 | 2/1958 | Fortney | 200/61.89 X |
| 2,822,530 | 2/1958 | Roten | 200/83 R X |
| 3,411,134 | 11/1968 | Shames | 200/61.89 X |
| 3,601,796 | 8/1971 | Mortimer | 340/41 |
| 3,617,073 | 11/1971 | Landsman | 200/61.89 X |

Primary Examiner—M. Henson Wood, Jr.
Assistant Examiner—John P. Silverstrim
Attorney, Agent, or Firm—Ralph B. Pastoriza

[57] ABSTRACT

An accelerator pedal switch and solid state electrical control circuit is adapted to be attached to a conventional vehicle for operating the vehicle brake light for a given time period in response to lifting of an operator's foot from the accelerator pedal. If the brakes are applied the normal brake light switch overrides the accelerator switch to maintain the brake light energized. If the brake pedal is not operated, the brake light will extinguish after the given period so that an early warning system is provided for cars following the vehicle.

1 Claim, 3 Drawing Figures

VEHICLE BRAKE WARNING LIGHT SYSTEM ACCELERATOR PEDAL SWITCH

This application is a division of my copending application Ser. No. 379,239 filed July 16, 1973 and entitled VEHICLE BRAKE WARNING LIGHT SYSTEM.

This invention relates to brake light controls for vehicles and more particularly to an improved accelerator pedal switch and solid state electrical control circuit, responsive to the removal of a driver's foot from the accelerator pedal in the vehicle to operate the brake light for a given period of time.

BACKGROUND OF THE INVENTION

In my U.S. Pat. No. 3,411,134 entitled "Control Device for Vehicle Brake Light" issued on Nov. 12, 1968 there is described a device which will energize the brake light of a vehicle whenever it is anticipated that the brakes might be used rather than at only those times when the brakes are actually applied. By this arrangement, other vehicles following the one vehicle under consideration would be warned that the brakes of the forward vehicle may be applied before the brakes actually are applied, all to the end that greater safety results in operating motor vehicles. The anticipating feature is provided by energizing the brake light in response to the removal of the driver's foot from the accelerator pedal regardless of whether or not the brake pedal is actually operated. The brake light will thus be energized earlier than would be the case were it operated in response only to applying the brakes.

The control device itself involved in my above-identified patent incorporates a mechanical type delay which will result in the brake light only being energized for a short period of time so that if the brakes are not actually applied after removal of the driver's foot from the accelerator pedal, the brake light will extinguish after this delay time.

BRIEF DESCRIPTION OF THE PRESENT INVENTION

The present invention constitutes an improvement over my above discussed patent in that a smaller and more compact structure which is more easily adapted to conventional cars is provided.

More particularly, the present invention contemplates an improved accelerator pedal switch for use with the all electric control circuit which switch may be built into the accelerator pedal at the time of manufacture or readily adapted to conventional accelerator pedals.

In accord with the improved present invention, an accelerator pedal switch and control circuit for a vehicle brake light normally operable upon the pressing of the vehicle brake from the vehicle brake battery includes a simple relay switch in parallel with the normal brake light switch and a resistance and capacitor series circuit for controlling a silican controlled rectifier switch shunting the relay coil of the relay switch. An accelerator pedal switch in turn connects between the relay coil and ground and is biased to a normally closed position such that when the accelerator pedal is depressed, the pedal switch is open and when pressure is removed from the accelerator pedal, the pedal switch closes to apply ground to the relay coil and silican controlled rectifier switch to operate the brake light for a given time period under control of the resistance and capacitor circuit and silican controlled rectifier switch.

The pedal switch forming this invention has unique design features providing for a snap action resulting in a very compact, simple and economical arrangement.

BRIEF DESCRIPTION OF THE DRAWINGS

A better understanding of the improved present invention will be had by referring to the accompanying drawings in which.

DETAILED DESCRIPTION OF THE PREFERRED EMBODIMENT

Figure 1:
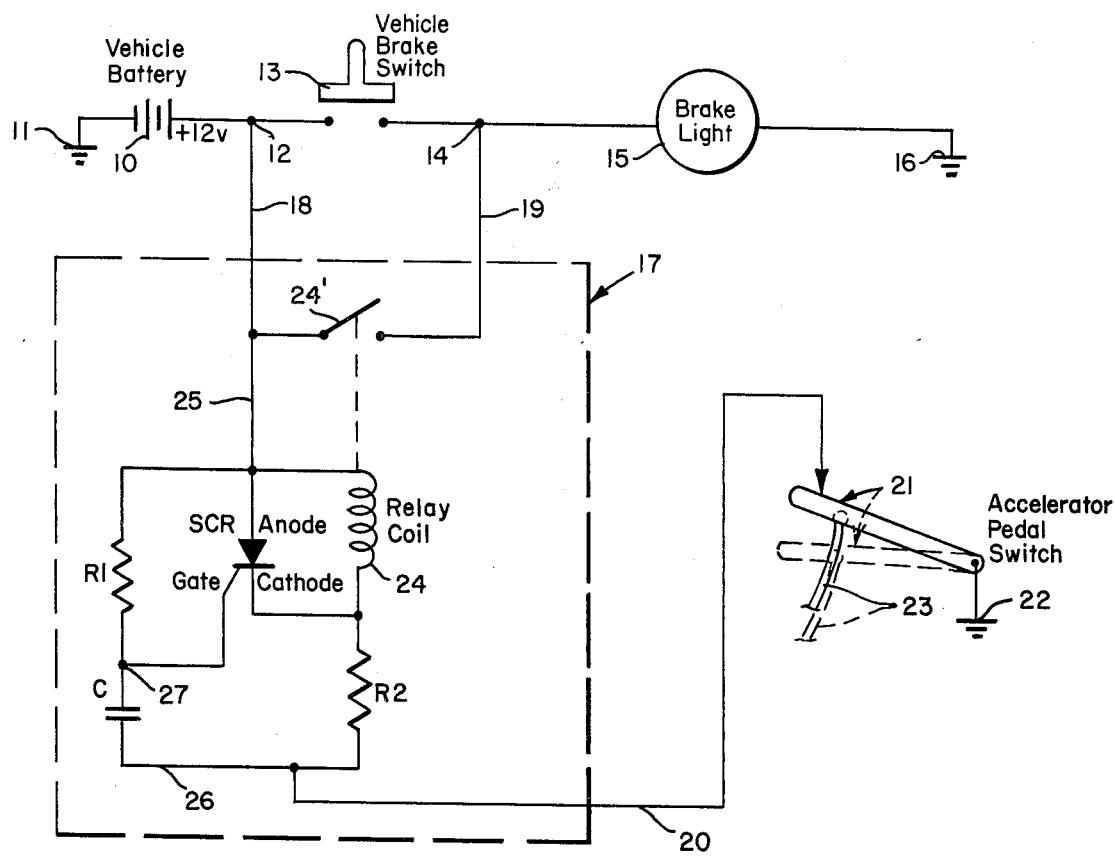
FIG. 1 is a complete circuit diagram of the accelerator pedal switch and control circuit for a vehicle brake light.

Referring to FIG. 1 there is illustrated in the upper left hand corner a conventional vehicle or car battery 10 grounded at 11 and providing 12 volts to a first terminal 12 of a conventional vehicle brake switch 13. A second terminal 14 of the vehicle brake switch connects to the brake light 15. The other side of the light is grounded at 16 so that whenever the brake pedal is operated, the switch 13 is closed to energize the brake light and whenever an operator removes his foot from the brake, the brake light switch 13 opens to extinguish the brake light.

The foregoing described components constitute conventional equipment on vehicles. In accord with the present circuit, there is provided a vehicle brake warning light system for energizing the brake light 15 for a given period of time in response to removal of an operator's foot pressure on the normal accelerator means in the vehicle. Essentially, this system includes a control circuit shown enclosed in a compact casing indicated by the dash-dot line 17. There are three external leads from this casing designated 18, 19, and 20, the latter lead being shown in the lower right hand portion of the casing.

To operate the control circuit in the casing 17, there is provided in accord with the present invention an accelerator pedal switch 21 between the output lead 20 and ground 22. This pedal switch cooperates with foot operated accelerator means in the vehicle a portion of which is shown at 23. The pedal switch 21 itself may be substituted for the conventional vehicle accelerator pedal or may be attached on top of the conventional accelerator pedal for actuation by foot pressure from an operator. As indicated by the solid line schematic showing in FIG. 1, the accelerator pedal switch 21 is normally closed in the absence of any foot pressure thereon so that ground 22 is applied to the output lead 20. The other two output leads 18 and 19 of FIG. 1 connect respectively across the vehicle brake switch 13 to the terminals 12 and 14 as shown.

Referring now to the specific controls in the casing 17, there is provided a relay coil 24 for operating a co-operating relay switch 24' connected in parallel across the normally open vehicle brake switch 13 by way of the leads 18 and 19. The relay coil 24 closes the relay switch 24' when energized and opens this switch when de-energized. One side of this relay coil is connected to the battery 10 by way of the electrical lead 25 and external lead 18.

A silican controlled rectifier switch SCR has anode, cathode and gate terminals as shown. The anode terminal connects to the lead 25 to the battery voltage. The cathode in turn connects to the other side of the relay coil 24 so that the silican controlled rectifier switch is connected across the relay coil in parallel.

The circuit in the casing 17 is completed by the provision of a resistance R1 and a capacitor C connected in series between the lead 25 from the battery 10 and one side of the accelerator pedal switch by way of leads 26 and 20. The gate terminal of the silican controlled rectifier switch connects to the junction point 27 between the resistance R1 and the capacitor C. An additional resistance R2 connects between the other side of the relay coil 24 and the one side of the accelerator pedal switch through the lead 20.

Figure 2:
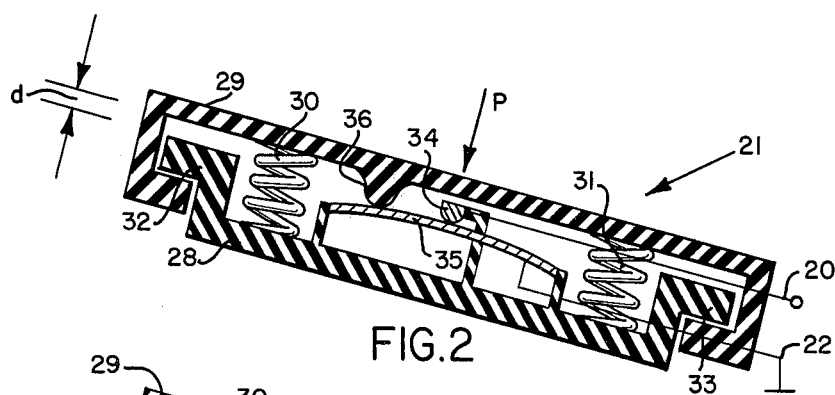
FIG. 2 is a cross-section of the pedal switch of the present invention in closed condition, the design being such that the pedal switch may be substituted for a conventional pedal or applied to the top surface of a conventional pedal; and, FIG. 3 is a cross-section of the pedal switch of FIG. 2 in open position.
Figure 3:
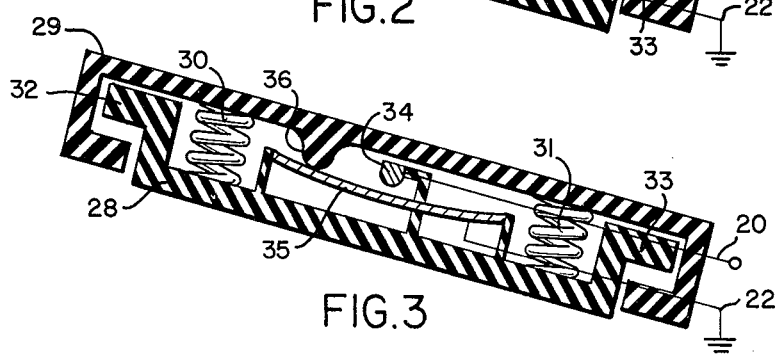

Referring now to FIGS. 2 and 3, details of the preferred embodiment of the accelerator pedal switch 21 will be described.

Referring first to FIG. 2, the switch is made up of lower and upper plate members 28 and 29 biased apart from each other as by springs 30 and 31. Flange portions 32 and 33 on the lower plate 28 overlap with flange portions on the upper plate 29 in spaced relation to permit a limited degree of movement of the plates towards and away from each other. In the absence of pressure, the lower and upper plates would be biased apart by the springs to assume the position illustrated.

As shown, there is provided a fixed contact 34 secured to the underside of the lower plate 28 arranged to be engaged by a flexible metal member 35 bowed upwardly and secured to the lower plate 28. The lead 20 connects to the fixed contact 34 and the ground 22 connects to the flexible metal member 35.

Referring to FIG. 3, there is shown the relative positions of the plates 28 and 29 when foot pressure is applied to the plate 29 to move the plate members towards each other against the bias of the springs 30 and 31. It will be noted that the flexible member 35 is bowed in a reverse direction when the plates are urged together. The bowing of the metal member in a reverse direction is accomplished by a projection 36 forming part of the upper plate 29. The flexible metal member 35 thus assumes a snapped bowed condition similar to an oil can base such that it is positively moved out of engagement with the fixed contact 34. Release of pressure on the upper plate 29 permits the bowed member 35 to snap back to its original bowed position illustrated in FIG. 2 to thereby effect engagement with the fixed contact 34 in a positive manner.

The foregoing construction for an accelerator pedal switch is unique and constitutes an important feature of this invention as it assures positive action of the application of ground or the removal of ground from the one side of the pedal switch connected to the lead 20.

In FIGS. 2 and 3, the overall thickness or distance between upper and lower plates making up the pedal is greatly exaggerated for purposes of clarity. Actually, the plates in assembled relationship provide a relatively flat configuration so that the pedal switch can be applied on top of a conventional accelerator pedal or, alternatively, simply substituted for the conventional accelerator pedal in the vehicle.

OPERATION

In operation, when the accelerator pedal swtich 21 is opened in response to foot pressure on the accelerator as indicated in FIG. 3, ground is removed from the lead 20 of the control circuit so that the silican control rectifiers switch is open and the lower end of the relay coil 24 is effectively open or ungrounded so that no current can flow therethrough. The brake light 15 will thus be de-energized.

If now the operator of the vehicle is confronted with an emergency whereby he removes his foot from the accelerator pedal, the pedal switch will immediately close by assuming the position illustrated in FIG. 2 thereby applying ground 22 to the lead 20. Application of ground to the control circuit will permit the relay coil to be energized by current flow from the battery and through the leads 18 and 25 to the top of the relay coil and thence through the additional resistance R2 to the grounded lead 20. Energization of the relay coil will close the relay switch to thereby immediately energize the brake light 15.

Simultaneously with the foregoing action, the capacitor C will immediately begin to charge up to battery voltage through its series connected resistance R1. The voltage charge on the capacitor as it charges is applied to the gate of the silican controlled rectifier switch and this voltage when it reaches a given voltage charge after a given time period determined by the time constant of the capacitor C and resistance R1 will cause the silican controlled rectifier switch to close or avalanche thereby shorting out the relay coil 24. Shorting of the relay coil 24 permits the relay switch to open and thereby de-energize the brake light after the referred to given period of time. However, should the operator immediately apply the brake after removing his foot from the accelerator pedal, the normal vehicle brake switch 13 of FIG. 1 will maintain the brake light 15 illuminated. In other words, the time period during which the brake light is operated by action of the relay switch is sufficiently long as to cover the length of time needed for the operator to change his foot from the accelerator pedal to the brake pedal.

On the other hand, if the suspected emergency does not really exist so that the vehicle operator does not actually apply the brakes, the brake light will be extinguished after the given period of time automatically.

If the operator now reapplies pressure to the accelerator pedal switch, ground is removed from the lead 20 thereby extinguishing operation of the silican controlled rectifier; that is, permitting the silican controlled rectifier switch to open. Further, reapplication of pressure to the accelerator pedal removes ground from the lower side of the relay coil 24 so that the brake light remains extinguished.

If the operator now removes pressure from the accelerator pedal, the foregoing cycle of events will be repeated.

From the foregoing, it will be evident that a system has been provided wherein the brake light is energized for only a given period of time whenever the vehicle operator removes his foot from the accelerator pedal. The arrangement is such that there is no interference with the normal energization of the brake light 15 by the conventional vehicle brake switch 13. Further, the control circuit itself within the casing 17 can be made extremely compact and can very easily be installed on any conventional vehicle by simply connecting the two output leads 18 and 19 to the terminals 12 and 14 on either side of the conventional vehicle brake switch and the lead 20 to the accelerator pedal switch 21 the other side of which is grounded. There thus results a simple, compact, and economical system greatly enhancing the safety of operation of vehicles.

In an actual constructed embodiment of the invention, the value of the components of the circuit used are fully identified as follows:

R1 = 220K ± 10% ½ watt
R2 = 150K ± 10% 2 watt
C1 = 10 micro-farad ± 10% 15 volt d.c.
SCR = 2N5060 .8 amps It will be understood that the given time period the light remains energized upon removal of the operator's foot can be varied by changing the value of C or R1 or both to change the time constant.

What is claimed is:

1. In a vehicle equipped with a battery, a brake light, a normally open brake light switch connected between the battery and brake light, a brake pedal for closing the brake light switch when depressed to thereby energize the brake light, a foot pressure operated accelerator means for accelerating the vehicle, and a vehicle brake warning light system for energizing said brake light for a given time period in response to removal of an operator's foot pressure on the accelerator means, a normally closed pedal switch for said foot operated accelerator means responsive to a given pressure applied by the operator's foot to open and responsive to removal of the operator's foot to close, said accelerator pedal switch including lower and upper plates having overlapping spaced flange portions so that they can move towards and away from each other over a limited distance; spring means between said plates biasing them apart; a fixed contact on the lower plate comprising one side of the switch; a flexible metal member connected to the lower plate in juxtaposed relation to said fixed contact comprising the other side of said switch connected to ground, said flexible metal member being bowed upwardly to engage said fixed contact in the absence of foot pressure on said pedal switch, foot pressure on the pedal switch urging the upper plate towards the lower plate; and projecting means on the upper plate engaging the metal member to cause it to assume a reversed bowed position when said upper plate moves towards the lower plate to result in a snap action which breaks the engagement of the metal member with said fixed contact thereby opening the pedal switch.

* * * * *